(12) United States Patent
Imai et al.

(10) Patent No.: US 6,388,556 B1
(45) Date of Patent: May 14, 2002

(54) FILM PRESSURE SENSITIVE RESISTOR AND PRESSURE SENSITIVE SENSOR

(75) Inventors: Takayuki Imai; Toshifumi Nakajima, both of Tokyo; Takahiro Ishii, Sakura; Toshio Ochiai, Tokyo; Nobuyuki Kohama; Nobutada Hyakutake, both of Kitakatsushika-gun, all of (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 09/946,662

(22) Filed: Sep. 5, 2001

(30) Foreign Application Priority Data

Sep. 7, 2000 (JP) .......................... 2000-272131
Jul. 25, 2001 (JP) ........................... 13-224809

(51) Int. Cl.[7] .............................................. H01C 10/10
(52) U.S. Cl. ............................ 338/114; 338/47; 338/99
(58) Field of Search ............................ 338/47, 99, 114

(56) References Cited

U.S. PATENT DOCUMENTS

| | | | | |
|---|---|---|---|---|
| 3,710,050 A | * | 1/1973 | Richards | 338/114 |
| 4,054,540 A | * | 10/1977 | Michalchik | 338/114 |
| 4,145,317 A | * | 3/1979 | Sado et al. | 338/114 |
| 4,237,682 A | * | 12/1980 | Miyamoto | 338/114 |
| 4,276,538 A | | 6/1981 | Eventoff et al. | |
| 4,301,337 A | | 11/1981 | Eventoff | |
| 4,314,227 A | | 2/1982 | Eventoff | |
| 4,314,228 A | | 2/1982 | Eventoff | |
| 4,315,238 A | | 2/1982 | Eventoff | |

FOREIGN PATENT DOCUMENTS

| | | |
|---|---|---|
| JP | 2-49029 | 8/1981 |
| JP | 56-108279 | 8/1981 |

* cited by examiner

Primary Examiner—Karl D. Easthom
(74) Attorney, Agent, or Firm—Bell, Boyd & Lloyd LLC

(57) ABSTRACT

A film pressure sensitive resistor comprises conductive particles such as carbon black, a binder such as polyester resin, and spherical elastic particles having an average particle diameter of 2 $\mu$m to 50 $\mu$m, and further has average surface roughness of 0.1 $\mu$m to 3 $\mu$m, a peak-to-peak concavo-convex period of 10 $\mu$m to 1000 $\mu$m, and an elastic modulus of 800 MPa to 8000 MPa so as to have reliable quality, and excellent environmental resistance, and durability to repeated use (depressing).

8 Claims, 4 Drawing Sheets

FILM PRESSURE SENSITIVE RESISTOR AND PRESSURE SENSITIVE SENSOR

BACKGROUND OF THE INVENTION

1. Field of the Invention

The present invention relates to a film pressure sensitive resistor in which a resistance value varies according to a pressure, a load, and the like, and to a pressure sensitive sensor made therefrom.

2. Description of Related Art

Figure 1A:
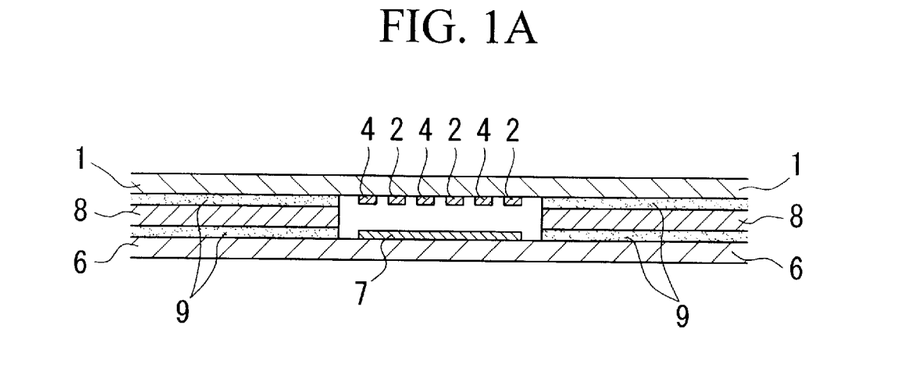
FIG. 1A is a cross-sectional view showing an internal structure of a pressure sensitive sensor using three electrodes.
Figure 1B:
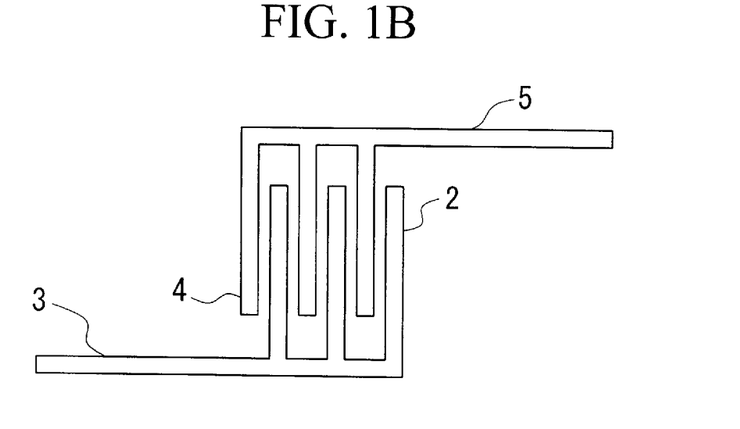
FIG. 1B is a plan view showing an electrode pattern and a wiring pattern formed on an upper circuit board in the pressure sensitive sensor shown in FIG. 1A.
Figure 1C:
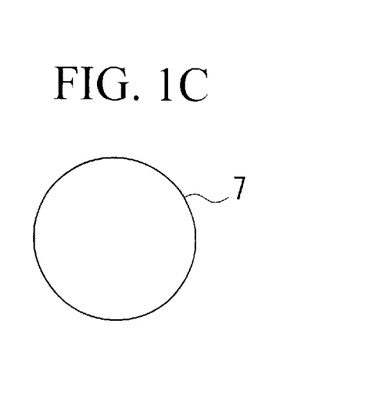
FIG. 1C is a plan view showing an electrode pattern formed on a lower circuit board in the pressure sensitive sensor shown in FIG. 1A.

As a conventional pressure sensitive resistor, for example, a pressure sensitive resistor having a structure as shown in FIGS. 1A to 1C is known. FIG. 1A is a cross sectional view showing an internal structure of a pressure sensitive resistor using three electrodes. FIG. 1B is a plan view showing an electrode pattern and a wiring pattern formed on an upper circuit board in the pressure sensitive sensor shown in FIG. 1A. FIG. 1C is a plan view showing an electrode pattern formed on a lower circuit board in the pressure sensitive sensor shown in FIG. 1A.

In the upper circuit board 1 according to this example, an electrode 2 shaped like the teeth of a comb and a wiring part 3 for connecting the electrode 2 and an external device (not shown) are formed, and furthermore, an electrode 4 shaped like the teeth of a comb and insulated from the electrode 2, and a wiring part 5 for connecting the electrode 4 and an external device (not shown) are formed as shown in FIG. 1B. The electrode 4 is formed on the same surface on which the above electrode 2 is formed. Furthermore, an electrode 7 shaped like a disc is formed on a lower circuit board 6 as shown in FIG. 1C. A spacer sheet 8 is provided between the upper circuit board 1 and the lower circuit board 6, and the upper circuit board 1 and the lower circuit board 6 are fixed by adhesion layers 9 which are provided between the upper circuit board 1 and the spacer sheet 8, and between the lower circuit board 6 and the spacer sheet 8. Furthermore, a space corresponding to the thickness of the spacer sheet 8 is formed between the electrodes 2 and 4 on the upper circuit board 1 and the electrode 7 on the lower circuit board 6.

In order to operate the above layer structure as a pressure sensitive sensor, at least one selected from the above three electrodes 2, 4, and 7, and at least a part of the electrode selected, must be formed as a film pressure sensitive resistor.

In the pressure sensitive sensor comprising the above compositions, when the pressure sensitive sensor has a load applied thereto from the upper circuit board 1 side, a part of the upper circuit board 1 is deformed and the electrodes 2 and 4 of the upper circuit board 1 contact the electrode 7 of the lower circuit board 6, and as a result, the electrodes 2 and 4 conduct to the lower circuit board 6 through the electrode 7. Furthermore, when the pressure sensitive sensor has a larger load applied thereto, the contact area of the electrodes 2 and 4 to the electrode 7 increases, and as a result, conductive resistance is decreased.

Figure 2A:
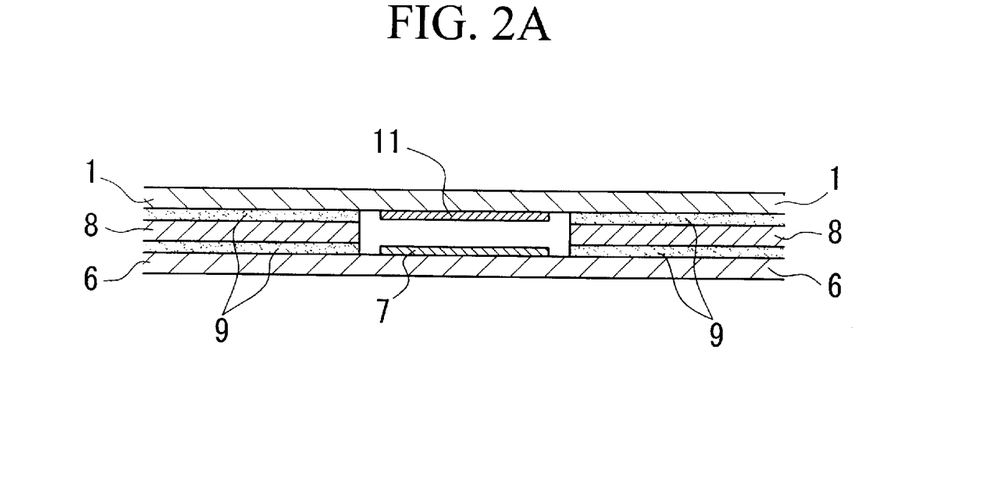
FIG. 2A is a cross-sectional view showing an internal structure of a pressure sensitive sensor using two electrodes.
Figure 2B:
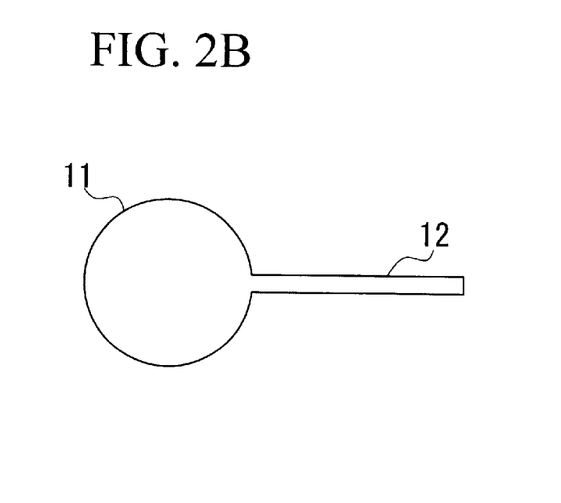
FIG. 2B is a plan view showing an electrode pattern and a wiring pattern formed on an upper circuit board in the pressure sensitive sensor shown in FIG. 2A.
Figure 2C:
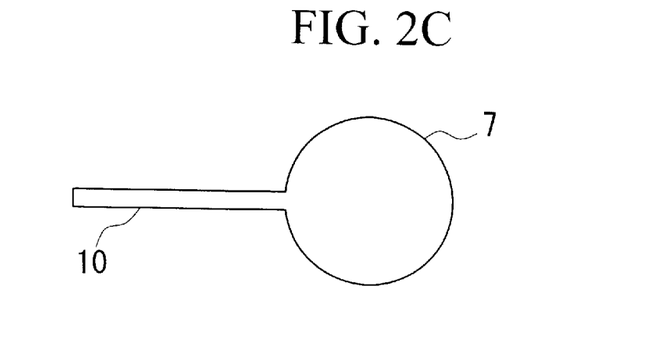
FIG. 2C is a plan view showing an electrode pattern formed on a lower circuit board in the pressure sensitive sensor shown in FIG. 2A.

As the other pressure sensitive sensor, for example, a pressure sensitive sensor having a structure shown in FIGS. 2A to 2C is known. FIG. 2A is a cross sectional view showing an internal structure of the pressure sensitive sensor using two electrodes which are oppositely provided. FIG. 2B is a plan view showing an electrode pattern and a wiring pattern formed on an upper circuit board in the pressure sensitive sensor shown in FIG. 2A. FIG. 2C is a plan view showing an electrode pattern formed on a lower circuit board in the pressure sensitive sensor shown in FIG. 2A.

In this example, the electrode 7 shaped like a disc is formed on the lower circuit board 6 and a wiring part 10 of an external device (not shown) is connected with the electrode 7. On the other hand, an electrode 11 shaped like a disc is formed on the upper circuit board 1 so as to be opposite to the electrode 7 on the lower circuit board 6. The electrode 11 is connected with a wiring part 12 of an external device (not shown).

In this type of pressure sensitive sensor, when the pressure sensitive sensor has a load applied thereon from the upper circuit board 1 side, a part of the upper circuit board 1 is deformed and the electrode 11 of the upper circuit board 1 contacts the electrode 7 of the lower circuit board 6, and as a result, the electrodes 7 and 11 conduct. Furthermore, when the pressure sensitive sensor has a larger load applied thereto, the contact area of the electrodes 7 and 11 increases, and as a result, conductive resistance is decreased.

Figure 3:
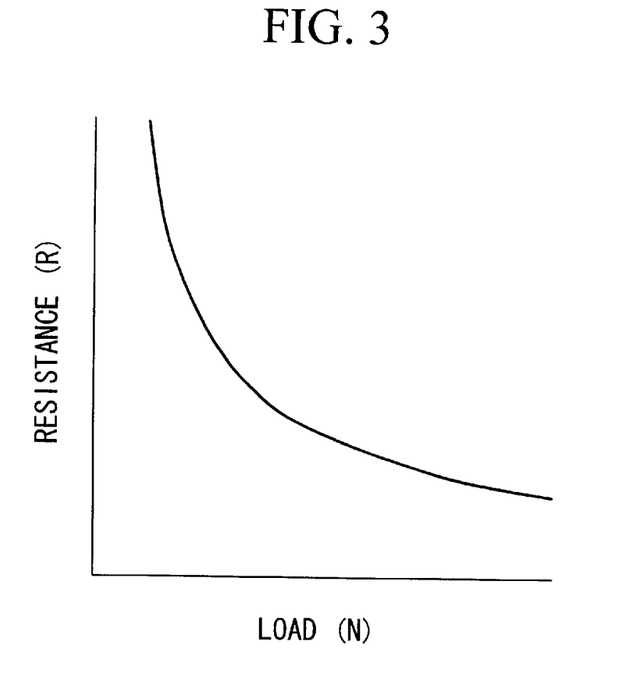
FIG. 3 is a graph showing an ideal resistance-load property in a pressure sensitive sensor.

Since variation in conductive resistance is caused by variation in contact resistance of the film pressure sensitive resistor and the opposite electrodes (Japanese Examined Patent Application, Second Publication, No. Hei 2-49029), it is expected that the properties of the above pressure sensitive sensor comprises a property such that the conductive resistance gradually decreases according to a gradual increase the load on the pressure sensitive sensor, that is, the conductive resistance gently changes depending on changes in the load on the sensor according to the curve shown in FIG. 3.

Figure 4:
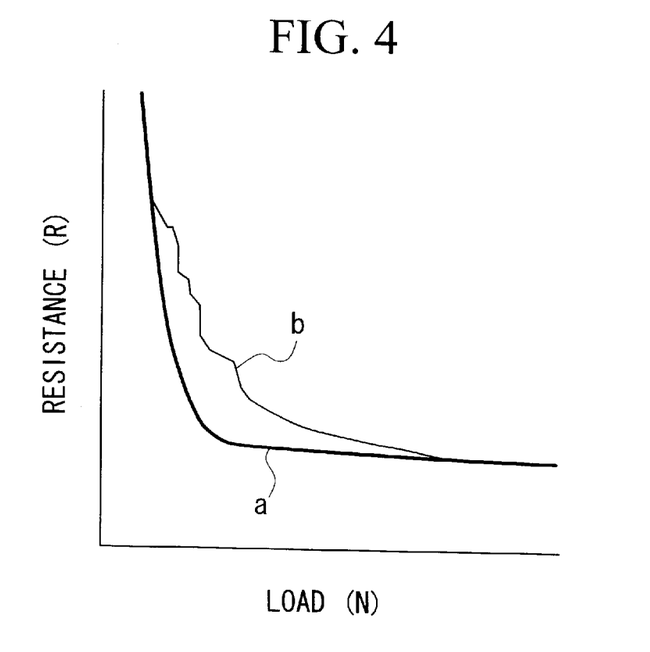
FIG. 4 is a graph showing a resistance-load property in a conventional pressure sensitive sensor.

However, in the conventional pressure sensitive sensor used in practice, since the resistance due to load varies steeply as the curve a shown in FIG. 4, the pressure sensitive sensor functions merely as a switch. Therefore, it is difficult for a conventional pressure sensitive sensor to detect a load in the low load range when contact of a upper electrode and a lower electrode starts, and as a result, the measurable load range is not wide.

Furthermore, in the conventional pressure sensitive sensor, since the resistance-load curve is not smooth and has steps as in curve b shown in FIG. 4, the step parts cannot be measured.

Furthermore, in conventional pressure sensitive sensors, since there is variation in performance among sensor products, the sensors lack operational reliability. Additionally, conventional pressure sensitive sensors have insufficient environmental resistance and durability to repeated use (depression).

BRIEF SUMMARY OF THE INVENTION

The present invention was made in order to solve the above problems, and an object of the present invention is to provide a film pressure sensitive resistor and a pressure sensitive sensor using the resistor in which the measurable load range is wide, the resistance-load characteristics show a smooth curve, their qualities are stable, and superior environmental resistance and durability to repeated use (depression) are obtained.

In order to solve the above problems, in the first aspect of the present invention, there is provided a film pressure sensitive resistor having an average surface roughness of 0.1 $\mu$m to 3 $\mu$m, a peak-to-peak concavo-convex period of 10 $\mu$m to 1000 $\mu$m, and an elastic modulus of 800 MPa to 8000 MPa.

As described above, since the above film pressure sensitive resistor comprises sufficient average surface roughness, sufficient peak-to-peak concavo-convex period, and sufficient elastic modulus, the contact area gently changes according to changes in load in the low load range when contact is started.

The above film pressure sensitive resistor may comprise conductive particles, a binder, and spherical elastic particles having an average particle diameter of 2 $\mu$m to 50 $\mu$m.

According to the above film pressure sensitive resistor, appropriate resistivity in the film is obtained and changes in resistance according to changes in load are easily exhibited.

In the above film pressure sensitive resistor, the elastic particles may be organic elastic fillers.

According to the above film pressure sensitive resistor, surface roughness, peak-to-peak concavo-convex period, and elastic modulus which are required by the film pressure sensitive resistor are obtained.

In the above film pressure sensitive resistor, the elastic particles may have an average particle diameter of 13 $\mu$m to 20 $\mu$m.

According to the above film pressure sensitive resistor, appropriate resistivity of the film is obtained and changes in resistance according to changes in load are easily exhibited.

In the above film pressure sensitive resistor, the conductive particles may be graphite or carbon black.

According to the above film pressure sensitive resistor, appropriate resistivity of film is obtained and changes in resistance according to changes in load are easily exhibited.

In the above film pressure sensitive resistor, at least a part of the binder may comprise a polyester resin.

According to this film pressure sensitive resistor, adhesiveness to a circuit board is improved.

In the elastic particles having an average particle diameter of 13 $\mu$m to 20 $\mu$m, the elastic particles are 10% to 16% by volume of the film pressure sensitive resistor.

According to this film pressure sensitive resistor, the measurable range of resistance in the low load range becomes wide.

Furthermore, in a second aspect of the present invention, there is provided a pressure sensitive sensor comprising at least two electrodes which are provided with a space therebetween when no load is applied and contact to conduct when a load is added, wherein conductive resistance is reduced according to the increase of the load, and at least a part of at least one of the electrodes is formed by the film pressure sensitive resistor according to any one of the above-mentioned film pressure sensitive resistors.

According to the pressure sensitive sensor, conductive resistance gently changes according to load changes in the low load range when contact is started, and the measurable range becomes wide. Furthermore, according to this pressure sensitive sensor, since the resistance-load curve does not have any steps, the entire measurable range is measured.

Furthermore, according to the pressure sensitive sensor of the present invention, individual differences between sensors are narrowed and excellent environmental resistance and durability to repeated use (depression) are obtained. Therefore, this pressure sensitive sensor is used for, for example, a sensor for detecting the weight of a person sitting on a chair, a sensor for input of instruments or electronic equipment, and the like.

DETAILED DESCRIPTION OF THE INVENTION

The present invention will be explained in detail below.

The film pressure sensitive resistor of the present invention is formed on a base material, and its resistance changes depending on the load. In the film pressure sensitive resistor, the average surface roughness is set to from 0.1 $\mu$m to 3 $\mu$m, the peak-to-peak concavo-convex period is from 10 $\mu$m to 1000 $\mu$m, and the elastic modulus is from 800 MPa to 8000 MPa. The peak-to-peak concavo-convex period means the distance between neighboring peaks when a Fourier transform is carried out on the surface roughness.

If the average surface roughness is less than 0.1 $\mu$m, the face of the film pressure sensitive resistor contacts the face of the opposing electrode on the base material, even if a low load is applied on the film pressure sensitive resistor and the opposing electrode. As a result, contact resistance is decreased and the curve in the low load range when contact starts steeply inclines as curve a shown in FIG. 4; therefore, the measurable load range is not wide. On the other hand, if the average surface roughness is more than 3 μm, when the film pressure sensitive resistor contacts to a counter electrode, they contact nonuniformly. As a result, the resistance-load property does not show a smooth curve and the curve has steps as in curve b shown in FIG. 4. Therefore, the average surface roughness is set from 0.1 μm to 3 μm, and preferably, 0.2 μm to 3 μm.

If the peak-to-peak concavo-convex period is less than 10 μm, the face of the film pressure sensitive resistor contacts the face of the opposing electrode on the base material, even if a low load is applied on the film pressure sensitive resistor and the opposing electrode. As a result, contact resistance is decreased and the curve in the low load range when contact starts steeply inclines as the curve a shown in FIG. 4; therefore, the measurable load range is not wide. On the other hand, if the peak-to-peak concavo-convex period is more than 1000 μm, as described above, the resistance-load characteristics do not show a smooth curve and the curve has steps as in curve b shown in FIG. 4, or the measurable load range is not wide. Therefore, the peak-to-peak concavo-convex period is set from 10 μm to 1000 μm, and preferably, from 20 μm to 500 μm.

If the elastic modulus is less than 800 MPa, although resistance-load properties are satisfactory, heat resistance, moisture resistance, durability to repeated use (depression), and the like are deteriorated. On the other hand, if the elastic modulus is more than 8000 MPa, when the film pressure sensitive resistor contacts a counter electrode, they contact nonuniformly. As a result, the resistance-load property does not exhibit a smooth curve and the curve has steps as in curve b shown in FIG. 4. Therefore, the elastic modulus is set from 800 MPa to 8000 MPa, and preferably, from 1000 MPa to 8000 MPa.

The film pressure sensitive resistor as described above comprises conductive particles, elastic particles, and a binder.

As the conductive particles, for example, metal particles, semiconductor particles such as indium-doped tin oxide, carbon compound particles, and the like can be used, and particularly, graphite or carbon black may be preferably used as the carbon compound particles. The mixing proportion of the conductive particles to a resin of 100 parts by weight is set to 2 to 200 parts by weight, preferably, 5 to 100 parts by weight. Since the conductive particles are mixed in the above-mentioned mixing proportion, appropriate resistivity in the film is obtained, and variation of resistance according to load is easily exhibited.

As the elastic particles, generally spherical organic elastic filler, inorganic oxide filler, or the like having an average particle diameter of 2 μm to 50 μm or less, and preferably 13 μm to 20 μm, can be used. As the organic elastic filler, polymers such as silicone polymer, acrylic polymer, styrene polymer, urethane polymer, and the like; and spherical particles composed of nylon 6, nylon 11, nylon 12, or the like are preferably used. The mixing proportion of the elastic particles to a resin of 100 parts by weight is set to 2 to 200 parts by weight, and preferably 5 to 100 parts by weight. Since the elastic particles are mixed in the above-mentioned mixing proportion, appropriate surface roughness which is required by the film pressure sensitive resistor used in the pressure sensitive sensor, appropriate peak-to-peak concavo-convex period, and elasticity are obtained.

As the binder, for example, a silicone rubber, a polyurethane resin, an epoxy resin, a phenol resin, a polyester resin, and the like can be used, and particularly, the binder comprising a polyester resin, and more particularly comprising a copolymerized polyester resin are preferably used in order to improve adhesiveness to the circuit board as a base material. Furthermore, a cross-linked resin may be used as the binder; then, as a curing agent, for example, an isocyanate compound and an amine compound are preferably mixed.

Most preferably, when elastic particles having an average particle size (diameter) of 13 to 20 μm are used, the amount of the elastic particles in the film pressure sensitive resistor is set to 10 to 16% by volume. Then, the elastic particles can have excellent resistance-load property and gentle change in the resistance in low load range, and as a result, the practical measurable range is increased. Simultaneously, changes in the resistance-load property is decreased.

As described above, since the film pressure sensitive resistor of this embodiment has sufficient average surface roughness, peak-to-peak concavo-convex period, and elasticity, the contact area gently changes according to the load variation in the low load region when contact is started.

The film pressure sensitive resistor can be preferably used for, for example, at least a part of the electrodes of the conventional pressure sensitive sensor shown in FIGS. 1A to 1C and FIGS. 2A to 2C.

For the upper circuit board 1 and the lower circuit board 6 in the pressure sensitive sensor in which the above-mentioned film pressure sensitive resistor, a film, for example, made of polyethylene terephthalate (PET), polyethylene naphthalate, polyphenylene sulfide, polyether imide, polyimide, or the like, which is suitably selected corresponding to use conditions such as heat resistance required in the pressure sensitive sensor.

The electrodes to be formed on the upper circuit board 1 and the lower circuit board 6, except the part of the film pressure sensitive resistor, are formed by a conventional method selected from the group of screen printing, vapor deposition, a spattering method, etching for metal foil, and the like. The most economical method is a general method of printing and drying a conductive material such as silver, carbon ink, and the like.

Furthermore, the film pressure sensitive resistor is preferably formed by dissolving main components such as the above-mentioned conductive particles, binder, and elastic particles in a solvent, and dispersing main components so as to be dissolved to obtain an ink composition; and printing a pattern on a base material using the ink composition and drying. This film pressure sensitive resistor may compose entire electrodes by directly providing on the upper circuit board 1 and the lower circuit board 6, or may compose a part of each electrode by providing on respective electrodes 2, 4, and 7.

As described above, in the pressure sensitive sensor in which the above-mentioned film pressure sensitive resistor is provided, the conductive resistance gently varies even if it is at low load range when contact is started, and as a result, the measurable range of the conductive resistance becomes wide. Furthermore, in this pressure sensitive sensor, since the resistance-load property (curve) does not have any steps, the entire measurable range can be measured.

Furthermore, in this pressure sensitive sensor, differences between sensors can be decreased, and excellent environmental resistance and durability to repeated use (depression) are obtained. Therefore, this pressure sensitive sensor is preferably used for, for example, a sensor for measuring the weight of a person sitting on a chair and a sensor for input of instruments, electronic equipment, and the like.

Examples 1 to 6 and Comparative Examples 1 to 6

A pressure sensitive sensor having a contact structure which comprises 16 contact points shown in FIGS. 2A to 2C is prepared by the following steps.

Figure 5A:
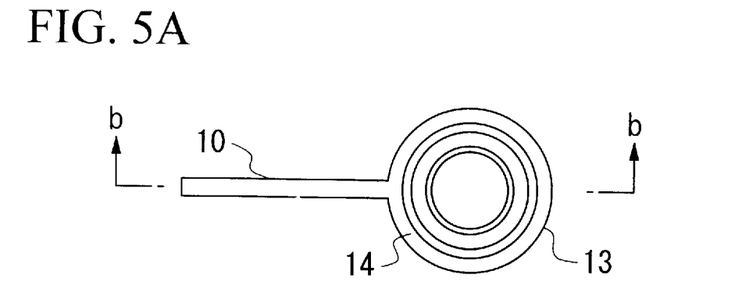
FIG. 5A is a plan view showing an example of a film pressure sensitive resistor provided on an electrode.
Figure 5B:
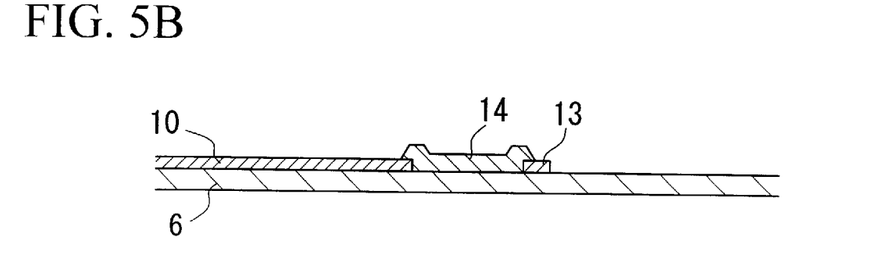
FIG. 5B is a cross-sectional view taken along line b—b of the film pressure sensitive resistor provided on an electrode shown in FIG. 5A.

A PET film 100 μm thick as the upper circuit board 1 is prepared, patterns of desired electrode 11 and wiring part 12 are printed on the PET film (board 1) using silver ink, and the patterns are dried to obtain the electrode 11 and the wiring part 12. Next, a PET film 100 μm thick as a lower circuit board 6 is prepared, a pattern of desired circular silver circuit 13 is printed on this PET film (board 6) shown in FIGS. 5A and 5B, and the pattern is dried to obtain the silver circuit 13. On the silver circuit 13 and the board 6 enclosed by the silver circuit 13, a film pressure sensitive resistor 14 is formed. The film pressure sensitive resistor 14 is formed by dissolving materials shown in Tables 1A and 1B in a suitable solvent and dispersing to obtain an ink composition, and further printing a pattern on a base material using the ink composition and drying.

TABLE 1A

|  | Ex. 1 | Ex. 2 | Ex. 3 | Ex. 4 | Ex. 5 | Ex. 6 |
| --- | --- | --- | --- | --- | --- | --- |
| Polyester resin | 100 | 100 | 100 | — | 100 | 100 |
| Silicone rubber | — | — | — | — | — | — |
| Epoxy resin | — | — | — | 100 | — | — |
| Carbon black | 20 | 20 | 20 | 30 | 20 | 20 |
| Spherical urethane particles (average particle size: 20 μm) | 20 | 30 | — | 20 | — | — |
| Spherical silicone particles (average particle size: 25 μm) | — | — | 20 | — | 5 | 50 |
| Glass beads (average particle size: 20 μm) | — | — | — | — | — | — |
| Talc powder | — | — | — | — | — | — |
| Isocyanate curing agent | 5 | 5 | 5 | — | 5 | 5 |
| Amine curing agent | — | — | — | 30 | — | — |

TABLE 1B

|  | Com. Ex. 1 | Com. Ex. 2 | Com. Ex. 3 | Com. Ex. 4 | Com. Ex. 5 | Com. Ex. 6 |
| --- | --- | --- | --- | --- | --- | --- |
| Polyester resin | 100 | 100 | 100 | 100 | — | 100 |
| Silicone rubber | — | — | — | — | 100 | — |
| Epoxy resin | — | — | — | — | — | — |
| Carbon black | 20 | 20 | 20 | 15 | 20 | 20 |
| Spherical urethane particles (average particle size: 20 μm) | — | 2 | — | — | — | — |
| Spherical silicone particles (average particle size: 25 μm) | — | — | 75 | — | 20 | — |
| Glass beads (average particle size: 20 μm) | — | — | — | — | — | 35 |
| Talc powder | — | — | — | 45 | — | — |
| Isocyanate curing agent | 5 | 5 | 5 | 5 | 5 | 5 |
| Amine curing agent | — | — | — | — | — | — |

Next, the spacer sheet 8 is prepared by providing adhesive layers 9 on both sides of a PET film so as to be approximately 100 μm thick, and the upper circuit board 1 and the lower circuit board 6 are respectively provided on either side of the spacer sheet 8 to obtain a laminated structure shown in FIG. 2A. The space enclosed by the spacer sheet 8 forms a circle in plan view, as shown in FIGS. 1B, 1C, 2B, and 2C. The diameter of the space is 12 mm.

Figure 6:
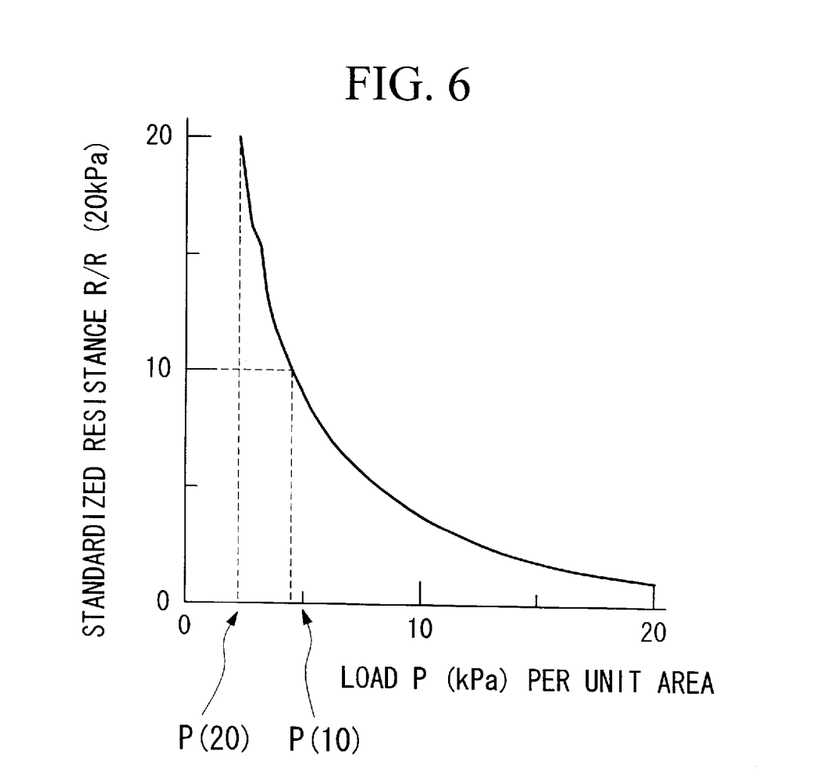
FIG. 6 is a graph showing a resistance-load property of a pressure sensitive sensor according to the present invention.

Properties such as surface roughness, peak-to-peak concavo-convex period, an elastic modulus measured by a hardness tester for measuring very small areas of each film pressure sensitive resistor shown in Examples 1 to 6 and Comparative Examples 1 to 6, were measured and are shown in Table 2. Furthermore, pressure sensitive sensors were prepared by providing a film pressure sensitive resistor shown in each of Examples 1 to 6 and Comparative Examples 1 to 6 therein. When a load is added to each sensor through a silicone rubber 10 mm thick and 20 mm diameter, a relationship of conductive resistance and the load between terminals of the electrodes are measured, and furthermore, the relationship of a representative example selected from Examples 1 to 6 is shown as a curve in FIG. 6. Furthermore, ten pressure sensitive sensors comprising 16 contact points according to each of the Examples 1 to 6 and Comparative Examples 1 to 6 are prepared to have 160 contact points in total, and the following three properties were evaluated at 160 contact points, and the results are shown in Table 2.

(1) Pressure sensitive property: a difference P(10)–P(20) between a load value P(20) when a resistance R/R (20 kPa) is 20 and a load value P(10) when the resistance RIR (20 kPa) is 10 is evaluated if the resistance R/R (20 kPa) is standardized as a resistance when adding load (pressure per area) of 20 kPa per area. As the difference P(10)–P(20) increases, the measurable range of the pressure sensitive sensor becomes wider. The CV value in Table 2 is calculated by dividing the standard deviation of the differences P(0)–P(20) evaluated at 160 contact points by the average of the differences P(10) –P(20), and as a result, dispersion is exhibited.

(2) Moisture and heat resistance: a change of rate (%) of the load value P(20) is measured after leaving the pressure sensitive sensor for 240 hours at 65° C. in the condition of relative humidity of 95% RH.

(3) Durability to repeated use (depression): change of rate (%) of the load value P(20) is measured after depressing contact positions using spherical silicone rubber 10 mm in diameter 200,000 times with a load of 10 N.

TABLE 2

| | Surface roughness (μm) | Peak-to-peak concavo–convex period (μm) | Elastic modulus (MPa) | Pressure sensitive resistance property (P(10)–P(20)) | | Moisture and heat resistance (%) | Durability to repeated use (%) |
|---|---|---|---|---|---|---|---|
| | | | | Average (kPa) | CV (%) | | |
| Ex. 1 | 0.4 | 55 | 4100 | 2.2 | 4 | 9 | −6 |
| Ex. 2 | 0.9 | 10 | 3800 | 2.1 | 7 | 13 | −7 |
| Ex. 3 | 0.6 | 98 | 2500 | 2.4 | 5 | 11 | −9 |
| Ex. 4 | 0.7 | 20 | 5100 | 1.8 | 9 | 16 | −5 |
| Ex. 5 | 0.2 | 600 | 3700 | 1.5 | 8 | 6 | −5 |
| Ex. 6 | 2.6 | 50 | 2000 | 2.5 | 9 | 16 | −9 |
| Com. Ex. 1 | 0.08 | 32 | 4500 | 0.3 | 4 | 8 | −6 |
| Com. Ex. 2 | 0.1 | 1300 | 4200 | 0.6 | 21 | 9 | −5 |
| Com. Ex. 3 | 4.8 | 29 | 1800 | 2.9 | 19 | 9 | −15 |
| Com. Ex. 4 | 0.2 | 9 | 5100 | 0.4 | 9 | 13 | −15 |
| Com. Ex. 5 | 0.7 | 115 | 750 | 2.1 | 7 | −35 | −13 |
| Com. Ex. 6 | 0.9 | 46 | 9000 | 1.9 | 19 | 11 | −10 |

As shown in Table 2 the pressure sensitive sensor according to each of the Examples 1 to 6 has clearly superior properties of pressure sensitive resistance property, moisture and heat resistance, and durability to repeated use (depressing) than those of Comparative Examples 1 to 6. In particular, when each pressure sensitive sensor according to Comparative Examples 2, 3, and 6 is used, there are some curves showing the resistance-load properties, the curves having some steps as in the curve b shown in FIG. 4.

Examples 7 to 12

A film pressure sensitive resistor was prepared using elastic particles composed of nylon 12 having an average particle size (diameter) and content according to each of the Examples and Comparative Examples shown in Table 3. The film pressure sensitive resistor comprises polyester resin as the binder and carbon black as the conductive particles, and the content of the binder and carbon black is 17.5% by volume to the film pressure sensitive resistor. Furthermore, the content of the elastic particles according to each of the Examples and Comparative Examples is shown with a volume ratio of the elastic particles to the film pressure sensitive resistor. The obtained film pressure sensitive resistor was measured with respect to the same properties as described above, and the results are shown in Table 3.

TABLE 3

| | | Ex. 7 | Ex. 8 | Ex. 9 | Ex. 10 | Ex. 11 | Ex. 12 |
|---|---|---|---|---|---|---|---|
| Elastic particles | Average particle size (μm) | 13 | 20 | 20 | 20 | 13 | 10 |
| | content (% by volume) | 16 | 10 | 16 | 6.5 | 6.5 | 10 |
| Surface roughness (μm) | | 1.7 | 2.1 | 2.4 | 1.4 | 0.6 | 0.9 |
| Peak-to-peak concavo–convex period (μm) | | 30 | 75 | 45 | 300 | 100 | 65 |
| Elastic modulus (MPa) | | 4100 | 4300 | 4200 | 4300 | 4400 | 4300 |
| Pressure sensitive resistance property (P(10)–P(20)) | Average (kPa) | 2.2 | 2.1 | 2.3 | 1.5 | 1.7 | 1.2 |
| | CV (%) | 4 | 5 | 3 | 9 | 8 | 3 |

As shown in Table 3, the elastic particles composed of nylon 12 have an average particle size (diameter) of 13 to 20 μm and being 10 to 16% by volume in the film pressure sensitive resistor having excellent resistance-load properties.

What is claimed is:
1. A film pressure sensitive resistor having an average surface roughness of 0.1 μm to 3 μm, a peak-to-peak concavo-convex period of 10 μm to 1000 μm, and an elastic modulus of 800 MPa to 8000 MPa.
2. A film pressure sensitive resistor according to claim 1, comprising conductive particles, a binder, and spherical elastic particles having an average particle diameter of 2 μm to 50 μm.
3. A film pressure sensitive resistor according to claim 2, wherein the elastic particles are organic elastic fillers.
4. A film pressure sensitive resistor according to claim 2, wherein the elastic particles have an average particle diameter of 13 μm to 20 μm.

5. A film pressure sensitive resistor according to claim 2, wherein the conductive particles are graphite or carbon black.

6. A film pressure sensitive resistor according to claim 2, wherein at least a part of the binder comprises a polyester resin.

7. A film pressure sensitive resistor according to claim 4, wherein the elastic particles is 10% to 16% by volume in the film pressure sensitive resistor.

8. A pressure sensitive sensor comprising at least two electrodes which are provided with a space therebetween when no load is applied and make contactand conduct when a load is added, wherein conductive resistance is reduced according to increased load and at least a part of at least one of the electrodes is formed by the film pressure sensitive resistor according to any one of claims 1 to 7.

* * * * *